United States Patent
Fan et al.

(10) Patent No.: US 11,217,256 B2
(45) Date of Patent: Jan. 4, 2022

(54) VOICE INTERACTION METHOD, DEVICE AND TERMINAL

(71) Applicant: Baidu Online Network Technology (Beijing) Co., Ltd., Beijing (CN)

(72) Inventors: Bingbing Fan, Beijing (CN); Hao Liang, Beijing (CN)

(73) Assignees: BAIDU ONLINE NETWORK TECHNOLOGY (BEIJING) CO., LTD., Beijing (CN); SHANGHAI XIAODU TECHNOLOGY CO. LTD., Shanghai (CN)

(*) Notice: Subject to any disclaimer, the term of this patent is extended or adjusted under 35 U.S.C. 154(b) by 161 days.

(21) Appl. No.: 16/563,488

(22) Filed: Sep. 6, 2019

(65) Prior Publication Data
US 2020/0194007 A1    Jun. 18, 2020

(30) Foreign Application Priority Data
Dec. 12, 2018 (CN) .......................... 201811519317.0

(51) Int. Cl.
*G10L 15/22* (2006.01)
*G10L 17/22* (2013.01)
(Continued)

(52) U.S. Cl.
CPC .............. *G10L 17/22* (2013.01); *G06F 3/167* (2013.01); *G10L 15/22* (2013.01); *G10L 15/26* (2013.01); *G10L 17/26* (2013.01); *H04M 3/4936* (2013.01)

(58) Field of Classification Search
CPC .................................. G10L 15/22; G06F 3/167
See application file for complete search history.

(56) References Cited

U.S. PATENT DOCUMENTS

| 2003/0078784 A1* | 4/2003 | Jordan ................. H04N 21/482 |
| | | 704/275 |
| 2011/0022393 A1* | 1/2011 | Waller ............... G01C 21/3664 |
| | | 704/270 |

(Continued)

FOREIGN PATENT DOCUMENTS

| CN | 104575504 A | 4/2015 |
| CN | 106230689 A | 12/2016 |

(Continued)

OTHER PUBLICATIONS

Search Report for Chinese Application No. 201811519317.0, dated Dec. 20, 2019 (6 pages).

(Continued)

*Primary Examiner* — Daniel Abebe
(74) *Attorney, Agent, or Firm* — Neal, Gerber & Eisenberg LLP

(57) ABSTRACT

A voice interaction method, device, and terminal. The method includes receiving a wake-up prompt, activating an interactive mode according to the wake-up prompt, displaying a dialog prompt identification in the interactive mode, obtaining a vocal request, wherein the vocal request is input in response to the dialog prompt identification, and displaying a requested content according to the vocal request. In a variety of interaction scenarios, such as in a scenario of interacting with a smart home appliance, a user can continuously provide vocal requests in an interactive mode, without waking up the interactive mode repeatedly, thereby improving user experience.

13 Claims, 4 Drawing Sheets

(51) Int. Cl.
*G06F 3/16* (2006.01)
*G10L 17/26* (2013.01)
*H04M 3/493* (2006.01)
*G10L 15/26* (2006.01)

(56) References Cited

U.S. PATENT DOCUMENTS

| | | | | |
|---|---|---|---|---|
| 2013/0006643 A1* | 1/2013 | Lindahl | ............ | G10L 15/22 |
| | | | | 704/275 |
| 2014/0244269 A1* | 8/2014 | Tokutake | ............ | G10L 15/00 |
| | | | | 704/275 |
| 2014/0278435 A1* | 9/2014 | Ganong, III | ............ | G10L 15/22 |
| | | | | 704/275 |
| 2015/0312351 A1* | 10/2015 | Wang | ............ | H04L 67/24 |
| | | | | 709/204 |
| 2016/0155443 A1* | 6/2016 | Khan | ............ | G06F 1/3203 |
| | | | | 704/275 |

FOREIGN PATENT DOCUMENTS

| | | |
|---|---|---|
| CN | 107680589 A | 2/2018 |
| CN | 107885810 A | 4/2018 |
| CN | 108132805 A | 6/2018 |
| CN | 108170785 A | 6/2018 |
| CN | 108259981 A | 7/2018 |
| CN | 108366281 A | 8/2018 |

OTHER PUBLICATIONS

Office Action for Chinese Application No. 201811519317.0 dated Dec. 30, 2019 (13 pages).

* cited by examiner

VOICE INTERACTION METHOD, DEVICE AND TERMINAL

CROSS-REFERENCE TO RELATED APPLICATION

This application claims priority to Chinese Patent Application No. 201811519317.0, filed on Dec. 12, 2018, which is hereby incorporated by reference in its entirety.

TECHNICAL FIELD

The present application relates to the field of intelligent interaction technology, and in particular, to a voice interaction method, device and terminal.

BACKGROUNDS

In the field of smart home appliances such as smart televisions (TV), a near-field voice interactive mode is usually utilized as a way of interacting, for example, a Bluetooth voice interactor is utilized to interact with a smart TV. Although certain convenience is provided to a user in this way, it is still required to manually perform a Bluetooth connection, which means that user's hands cannot be truly liberated. Currently, an optimized interaction method is to control smart home appliances by using a far-field interactive mode, which is also suitable for smart TVs or far-field TV box devices.

However, in the current voice interaction technology, a user has to provide a wake-up prompt first, then speak out a search requirement. Especially when searching for video resources for playing, a user usually has to provide supplemental information multiple times to find out the content he wants to watch, and the user has to speak out wake-up words repeatedly every time he interacts, which is very inconvenient and leads to low search efficiency.

SUMMARY

A voice interaction method, device and terminal are provided according to embodiments of the present application, so as to at least solve the above technical problems in the existing technology.

In a first aspect, a voice interaction method is provided according to an embodiment of the present application. The method includes receiving a wake-up prompt, activating an interactive mode according to the wake-up prompt, displaying a dialog prompt identification in the interactive mode, obtaining a vocal request, wherein the vocal request is input in response to the dialog prompt identification, and displaying a requested content according to the vocal request.

In an implementation, after displaying the requested content, the method further includes displaying the dialog prompt identification again in the interactive mode, obtaining an updated vocal request, and displaying an updated requested content according to the updated vocal request.

In an implementation, the dialog prompt identification includes a search prompt indicator, and the search prompt indicator includes a general search start prompt word and a preset dialogue timer.

In an implementation, the dialog prompt identification includes a content guide, and the content guide is used to prompt a user to provide requested content relevant with the content guide.

In an implementation, prior to activating the interactive mode according to the wake-up prompt, the method further includes determining whether a content of the wake-up prompt is associated with a preset interaction scenario, and activating the interactive mode according to the wake-up prompt, in a case that the content of the wake-up prompt is associated with the preset interaction scenario.

In an implementation, after obtaining the vocal request, the method further includes determining whether a content of the vocal request is associated with a search request in the preset interaction scenario, and exiting the interactive mode, in a case that the content of the vocal request is not associated with the search request in the preset interaction scenario.

In a second aspect, a voice interaction device is provided according to an embodiment of the present application. The device includes a wake-up prompt receiving module configured to receive a wake-up prompt, an interactive mode activating module configured to activate an interactive mode according to the wake-up prompt, a prompt identification displaying module configured to display a dialog prompt identification in the interactive mode, a vocal request obtaining module configured to obtain a vocal request, wherein the vocal request is input in response to the dialog prompt identification, and a requested content displaying module configured to display a requested content according to the vocal request.

In an implementation, the device further includes an interaction scenario determination module configured to determine whether a content of the wake-up prompt is associated with a preset interaction scenario, and to activate the interactive mode according to the wake-up prompt, in a case that the content of the wake-up prompt is associated with the preset interaction scenario.

In an implementation, the device further includes a requirement determination module configured to determine whether a content of the vocal request is associated with a search request in the preset interaction scenario, and to exit the interactive mode, in a case that the content of the vocal request is not associated with the search request in the preset interaction scenario.

In a third aspect, a voice interaction terminal is provided according to an embodiment of the present application. The functions may be implemented by using hardware or by corresponding software executed by hardware. The hardware or software includes one or more modules corresponding to the functions described above.

In a possible design, the voice interaction terminal structurally includes a processor and a memory, wherein the memory is configured to store programs which support the voice interaction terminal in executing the voice interaction method in the first aspect. The processor is configured to execute the programs stored in the memory. The voice interaction terminal may further include a communication interface through which the voice interaction terminal communicates with other devices or communication networks.

In a fourth aspect, a non-transitory computer readable storage medium for storing computer software instructions used for a voice interaction device is provided. The computer readable storage medium can include programs involved in executing the voice interaction method described above in the first aspect.

One of the above technical solutions has the following advantages or beneficial effects: In a variety of interaction scenarios, such as in a scenario of interacting with a smart home appliance, a user can continuously provide vocal requests in an interactive mode, without waking up the interactive mode repeatedly, thereby improving user experience.

The above summary is provided only for illustration and is not intended to be limiting in any way. In addition to the illustrative aspects, embodiments, and features described above, further aspects, embodiments, and features of the present application will be readily understood from the following detailed description with reference to the accompanying drawings.

BRIEF DESCRIPTION OF THE DRAWINGS

In the drawings, unless otherwise specified, identical or similar parts or elements are denoted by identical reference numerals throughout the drawings. The drawings are not necessarily drawn to scale. It should be understood these drawings merely illustrate some embodiments of the present application and should not be construed as limiting the scope of the present application.

DETAILED DESCRIPTION OF THE EMBODIMENTS

Hereafter, only certain exemplary embodiments are briefly described. As can be appreciated by those skilled in the art, the described embodiments may be modified in different ways, without departing from the spirit or scope of the present application. Accordingly, the drawings and the description should be considered as illustrative in nature instead of being restrictive.

Embodiment I

Figure 1:
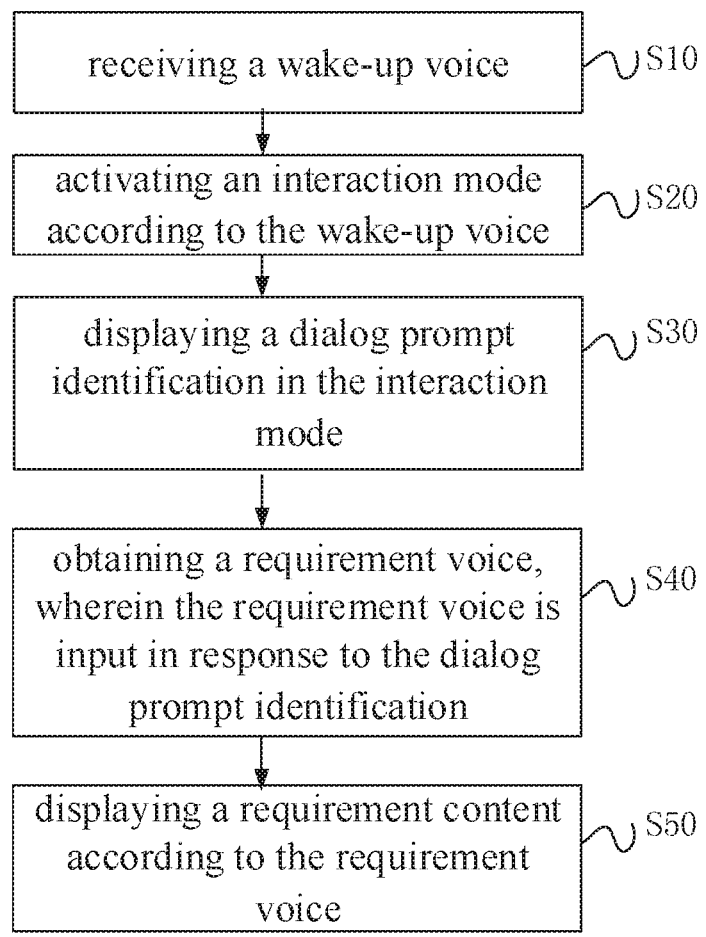
FIG. 1 is a flowchart showing a voice interaction method according to an embodiment.

As shown in FIG. 1, in an implementation, a voice interaction method may include receiving a wake-up prompt at S10, activating an interactive mode according to the wake-up prompt at S20, displaying a dialog prompt identification in the interactive mode at S30, obtaining a vocal request, wherein the vocal request is input in response to the dialog prompt identification at S40, and displaying a requested content according to the vocal request at S50.

This embodiment is applicable to smart home appliances, such as smart TVs and smart air conditioners, and the like. Taking a smart TV as an example for illustration, firstly, a wake-up prompt, for example, "Xiaodu, Xiaodu, turn on the TV" is received. Then, the content of the wake-up prompt may be parsed. If the parsing results are messy codes, which means no clear content of a wake-up prompt is obtained, the interactive mode cannot be activated. Then, a user is prompted to speak out again a wake-up word for waking up the smart home appliance. The way of prompting to re-obtain a wake-up prompt can also be adaptively designed according to hardware of a smart home appliance. Taking a smart TV as an example again, if an indicator light turns blue and flickers, with its brightness being gradually weakened to none, it is a prompt that a wake-up prompt should be re-obtained so that the smart TV may be waken up.

When it is determined that the parsing result of a wake-up prompt includes clear wake-up words, the interactive mode may be activated, and an interface of entering the interactive mode may be displayed on the TV screen. This interface can be adaptively designed as needed. A dialog prompt identification is displayed then in the interactive mode, and its function is to remind a user to notice dialogue timer, to provide a requested content, to provide a search start prompt word and the like. The dialog prompt identification can be implemented in various manners and can be adaptively designed according to requirements. Furthermore, the designed position of the dialog prompt identification can also be adaptively adjusted, all of which fall into the protection scope of the present implementation. For example, the dialog prompt identification is designed as a dynamic circle displayed in the interface, which represents dialogue timer for a user. The dialog prompt identification may also be an animation designed as two cartoon figures interacting with a TV, which indicates that a user is prompted to provide a requested content. The dialog prompt identification may further be designed as a trumpet-shaped logo with keywords such as "Xiaodu", which reminds a user to speak out the key words before starting a search.

After seeing the dialog prompt identification, a user can interact with a smart home appliance by providing vocal requests. For example, a vocal request provided by a user is "Xiaodu, Xiaodu, I want to watch a movie". After receiving the vocal request, a voice recognition is performed, and the keyword "movie" may be obtained. In this case, the smart TV can perform a search by using the keyword "movie" or keywords which are related to "movie", such as "hot movie". After the search is completed, the search results of searching for "hot movie" are displayed in the interface, and a dialog prompt identification may also be displayed at the same time. If a further search is not required, the interactive mode is directly exited. If a further search is required, another vocal request can be continuously provided, until the requested content is found out, and then the interactive mode can be exited automatically.

Certainly, the voice interaction method according to the embodiment includes, but is not limited to, a method for interacting with a smart TV, it can also be applied to other smart home appliances such as a smart air conditioner. The process of interacting therewith is similar to the method mentioned above. Thus, no further details are provided herein again, all of which fall into the protection scope of this implementation.

In an implementation, after displaying the requested content, the method may further include displaying the dialog prompt identification again in the interactive mode, obtaining an updated vocal request, and displaying an updated requested content according to the updated vocal request.

In an example, after the requested content with regard to the keyword "movie" is displayed, a user can provide a further vocal request after seeing a dialog prompt identification. For example, the vocal request provided by a user can be "Hong Kong movie". After receiving the vocal request of "Hong Kong movie", a voice recognition is performed, and the keyword "Hong Kong" may be obtained. In this case, the smart TV can perform a search by using the keyword "Hong Kong" or keywords which are related to "Hong Kong". After the search is completed, the search results of searching for "Hong Kong, hot movie" are then displayed in the interface of the smart TV, and a dialog prompt identification is displayed again.

For example, a vocal request of "gangster movie" is further provided by the user. After receiving the vocal request, a voice recognition is performed, and the keyword "gangster" may be obtained. In this case, the smart TV can perform a search by using the keyword "gangster" or keywords which are related to "gangster", such as "police", "gang" or "bandit". After the search is completed, the searching results of searching for "Hong Kong, hot, gangster movie" are then displayed in the interface of the smart TV, a dialog prompt identification is displayed again.

Continuously, for example, a vocal request of "performed by Liu XX" is further provided by the user. After receiving the vocal request, a voice recognition is performed, and the keyword "Liu XX" may be obtained. In this case, the smart TV can perform a search by using the keyword "Liu XX". After the search is completed, the searching results of searching for "Hong Kong, hot, gangster movie, Liu XX" are then displayed in the interface of the smart TV, a dialog prompt identification is displayed again.

Continuously, for another example, a vocal request of "next page" is provided by the user. After receiving the vocal request, a voice recognition is performed. In this case, according to the recognition results, the next page of the searching results is then displayed in the interface of the smart TV, and a dialog prompt identification is displayed at the same time again. After a further vocal request of "play the first one" is provided by the user, the corresponding program is played, and the interactive mode is exited automatically.

In an implementation, the dialog prompt identification may include a search prompt indicator, and the search prompt indicator may include a general search start prompt word and a preset dialogue timer.

The general search start prompt word includes a search start prompt word, such as "Xiaodu, Xiaodu". The search start prompt word can be displayed all the time during the entire searching process or can be displayed only at the beginning of the searching process. The search prompt indicator may also include a preset dialogue timer, such as a time progress bar. A vocal request should be provided by a user within the preset dialogue timer. If no vocal request is provided by a user within the preset dialogue timer, the interactive mode is exited. Alternatively, if the search prompt indicator disappears, the current interactive mode is exited automatically, thereby avoiding mis-operation. The duration of the dialogue timer may be set to 1 minute or several minutes in advance, for example. An adaptive adjustment of the duration of the preset dialogue timer may be made according to different product types, all of which fall into the protection scope of this implementation.

In an implementation, the dialog prompt identification may include a content guide, and the content guide is used to prompt a user to provide a requested content relevant with the content guide.

The content guide is used to prompt a user to provide a relevant requested content after obtaining a vocal request each time during an interaction process. Taking a smart TV as an example, when a number of movies regarding "Hong Kong, hot, gangster, Liu XX" are searched out and displayed in the interface of the smart TV, the top ranked hot movie "Infernal Affairs" may be displayed in the content guide, which is used to prompt the user to directly provide a vocal request of "Xiaodu, Xiaodu, I want to see Infernal Affairs." Alternatively, the user may also provide a vocal request of "Xiaodu, Xiaodu, I want to watch the third film, Chill" according to the content displayed on the current page.

Figure 2:
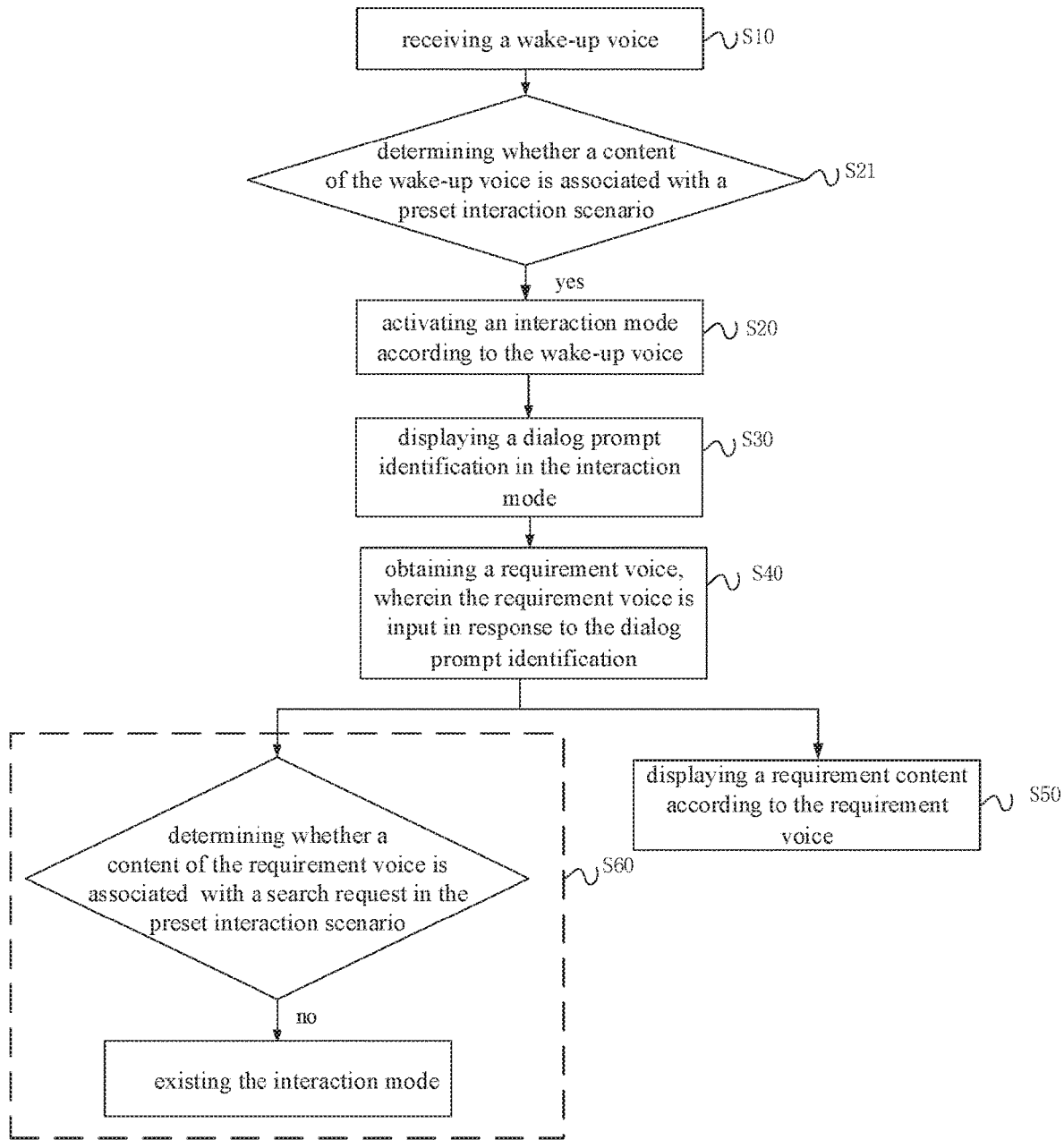
FIG. 2 is a schematic diagram showing another voice interaction method according to an embodiment.

As shown in FIG. 2, in an implementation, prior to S20, the method may further include determining whether a content of the wake-up prompt is associated with a preset interaction scenario, and activating the interactive mode according to the wake-up prompt, in a case that the content of the wake-up prompt is associated with the preset interaction scenario.

The wake-up words for different kinds of smart home appliances need to be associated with preset interaction scenarios. For example, the wake-up word for a smart TV may be "turn on the TV", and the wake-up word for a smart air conditioner may be "turn on the air conditioner". For a smart TV, using the wake-up word "turn on the air conditioner" will fail to be associated with the preset interaction scenario of the smart TV. Therefore, to avoid startup errors, it is important and necessary to determine whether a content of the wake-up prompt is associated with a preset interaction scenario.

As shown in FIG. 2, in an implementation, after S40, the method may further include determining whether a content of the vocal request is associated with a search request in the preset interaction scenario, and exiting the interactive mode, in a case that the content of the vocal request is not associated with the search request in the preset interaction scenario.

In an example, in the interactive mode of various scenarios, relevant search requirements associated with preset interaction scenarios may be stored. For example, in a preset interaction scenario of a smart TV, the stored relevant search requirements may be "Xiaodu, Xiaodu, I want to watch a movie", "Hong Kong movie", "I want to watch news broadcast" and the like. In a preset interaction scenarios of a smart air conditioner, the stored relevant search requirements may be "Xiaodu, Xiaodu, hot air" and the like. If, in the interactive mode of a smart TV, a user says search requirements which are not associated with the search requests in the preset interaction scenario of the smart TV, such as "Please set the temperature to 10 degrees" or "Please turn to the intermediate wind", the current interactive mode is exited automatically.

Embodiment II

Figure 3:
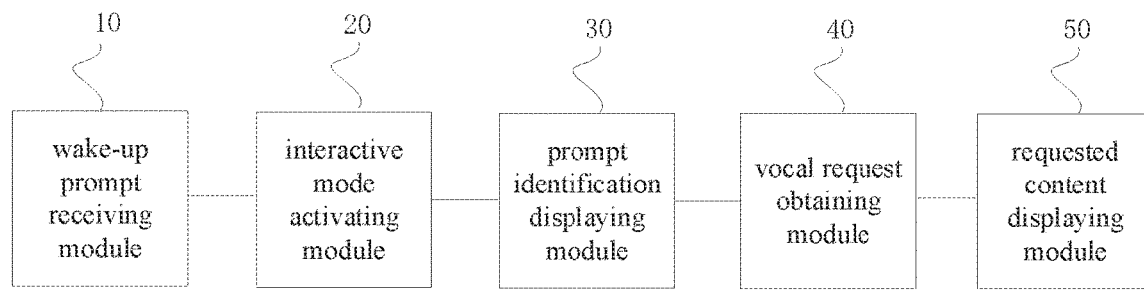
FIG. 3 is a block diagram showing a voice interaction device according to an embodiment.

As shown in FIG. 3, in an implementation, a voice interaction device may include a wake-up prompt receiving module 10 configured to receive a wake-up prompt, an interactive mode activating module 20 configured to activate an interactive mode according to the wake-up prompt, a prompt identification displaying module 30 configured to display a dialog prompt identification in the interactive mode, a vocal request obtaining module 40 configured to obtain a vocal request, wherein the vocal request is input in response to the dialog prompt identification, and a requested content displaying module 50 configured to display a requested content according to the vocal request.

Figure 4:
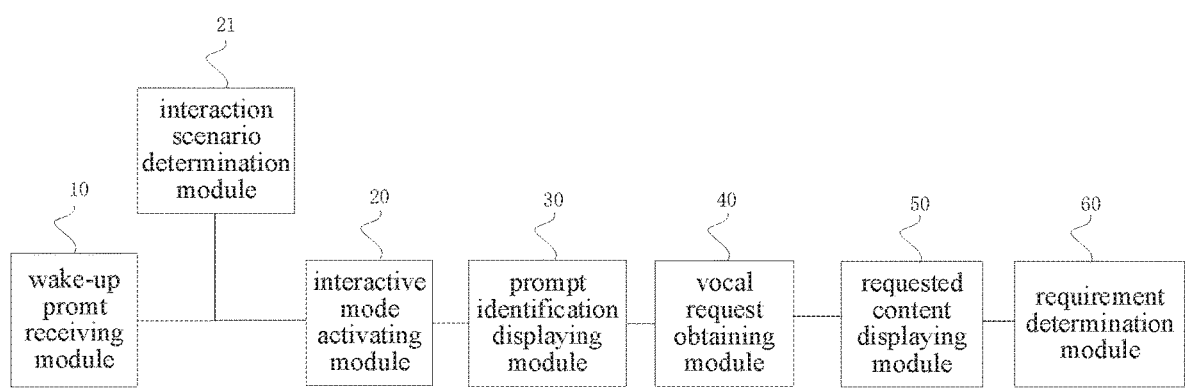
FIG. 4 is a block diagram showing another voice interaction device according to an embodiment.

As shown in FIG. 4, in an embodiment, the device further includes an interaction scenario determination module 21 configured to determine whether a content of the wake-up prompt is associated with a preset interaction scenario, and to activate the interactive mode according to the wake-up prompt, in a case that the content of the wake-up prompt is associated with the preset interaction scenario.

As shown in FIG. 4, in an embodiment, the device further includes a requirement determination module 60 configured to determine whether a content of the vocal request is associated with a search request in the preset interaction scenario, and to exit the interactive mode, in a case that the content of the vocal request is not associated with the search request in the preset interaction scenario.

According to the embodiments, in a variety of interaction scenarios, such as in a scenario of interacting with a smart home appliance, a user can continuously provide vocal requests in an interactive mode, without waking up the interactive mode repeatedly, thereby improving user experience.

Embodiment III

Figure 5:
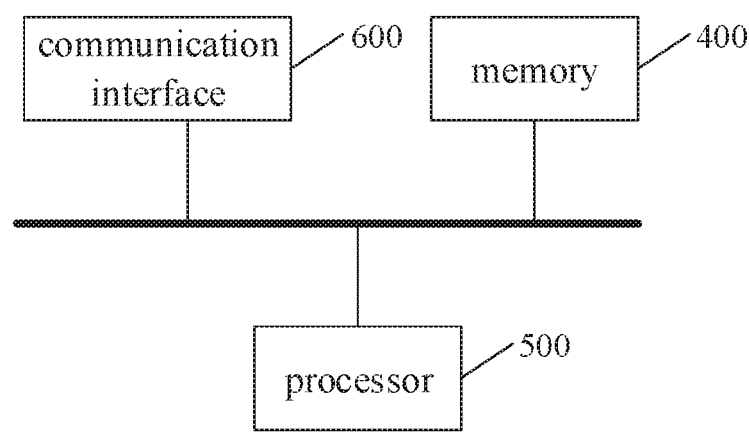
FIG. 5 is a schematic diagram showing a voice interaction terminal according to an embodiment.

As shown in FIG. 5, a voice interaction terminal is provided according to an embodiment of the present application. The voice interaction terminal includes a memory 400, a processor 500, wherein a computer program that can run on the processor 500 is stored in the memory 400. The processor 500 executes the computer program to implement the voice interaction method according to the foregoing embodiments. The number of either the memory 400 or the processor 500 may be one or more. The terminal may further include a communication interface 600 configured to enable the memory 400 and the processor 500 to communicate with an external device.

The memory 400 may include a high-speed RAM memory and may also include a non-volatile memory, such as at least one magnetic disk memory.

If the memory 400, the processor 500, and the communication interface 600 are implemented independently, the memory 400, the processor 500, and the communication interface 600 may be connected to each other via a bus to realize mutual communication. The bus may be an Industry Standard Architecture (ISA) bus, a Peripheral Component Interconnected (PCI) bus, an Extended Industry Standard Architecture (EISA) bus, or the like. The bus may be categorized into an address bus, a data bus, a control bus, and the like. For ease of illustration, only one bold line is shown in FIG. 5 to represent the bus, but it does not mean that there is only one bus or one type of bus.

Optionally, in a specific implementation, if the memory 400, the processor 500, and the communication interface 600 are integrated on one chip, the memory 400, the processor 500, and the communication interface 600 may implement mutual communication through an internal interface.

Embodiment IV

According to an embodiment, it is provided a computer-readable storage medium having computer programs stored thereon. When executed by a processor, the programs implement the voice interaction method described in the Embodiment I.

In the description of the specification, the description of the terms "one embodiment," "some embodiments," "an example," "a specific example," or "some examples" and the like means the specific features, structures, materials, or characteristics described in connection with the embodiment or example are included in at least one embodiment or example of the present application. Furthermore, the specific features, structures, materials, or characteristics described may be combined in any suitable manner in any one or more of the embodiments or examples. In addition, different embodiments or examples described in this specification and features of different embodiments or examples may be incorporated and combined by those skilled in the art without mutual contradiction.

In addition, the terms "first" and "second" are used for descriptive purposes only and are not to be construed as indicating or implying relative importance or implicitly indicating the number of indicated technical features. Thus, features defining "first" and "second" may explicitly or implicitly include at least one of the features. In the description of the present application, "a plurality of" means two or more, unless expressly limited otherwise.

Any process or method descriptions described in flowcharts or otherwise herein may be understood as representing modules, segments or portions of code that include one or more executable instructions for implementing the steps of a particular logic function or process. The scope of the preferred embodiments of the present application includes additional implementations where the functions may not be performed in the order shown or discussed, including according to the functions involved, in substantially simultaneous or in reverse order, which should be understood by those skilled in the art to which the embodiment of the present application belongs.

Logic and/or steps, which are represented in the flowcharts or otherwise described herein, for example, may be thought of as a sequencing listing of executable instructions for implementing logic functions, which may be embodied in any computer-readable medium, for use by or in connection with an instruction execution system, device, or device (such as a computer-based system, a processor-included system, or other system that fetch instructions from an instruction execution system, device, or device and execute the instructions). For the purposes of this specification, a "computer-readable medium" may be any device that may contain, store, communicate, propagate, or transport the program for use by or in connection with the instruction execution system, device, or device. More specific examples (not a non-exhaustive list) of the computer-readable media include the following: electrical connections (electronic devices) having one or more wires, a portable computer disk cartridge (magnetic device), random access memory (RAM), read only memory (ROM), erasable programmable read only memory (EPROM or flash memory), optical fiber devices, and portable read only memory (CDROM). In addition, the computer-readable medium may even be paper or other suitable medium upon which the program may be printed, as it may be read, for example, by optical scanning of the paper or other medium, followed by editing, interpretation or, where appropriate, process otherwise to electronically obtain the program, which is then stored in a computer memory.

It should be understood various portions of the present application may be implemented by hardware, software, firmware, or a combination thereof. In the above embodiments, multiple steps or methods may be implemented in software or firmware stored in memory and executed by a suitable instruction execution system. For example, if implemented in hardware, as in another embodiment, they may be implemented using any one or a combination of the following techniques well known in the art: discrete logic circuits having a logic gate circuit for implementing logic functions on data signals, application specific integrated circuits with suitable combinational logic gate circuits, programmable gate arrays (PGA), field programmable gate arrays (FPGAs), and the like.

Those skilled in the art may understand that all or some of the steps carried in the methods in the foregoing embodiments may be implemented by a program instructing relevant hardware. The program may be stored in a computer-readable storage medium, and when executed, one of the steps of the method embodiment or a combination thereof is included.

In addition, each of the functional units in the embodiments of the present application may be integrated in one processing module, or each of the units may exist alone physically, or two or more units may be integrated in one module. The above-mentioned integrated module may be implemented in the form of hardware or in the form of software functional module. When the integrated module is implemented in the form of a software functional module and is sold or used as an independent product, the integrated module may also be stored in a computer-readable storage medium. The storage medium may be a read only memory, a magnetic disk, an optical disk, or the like.

The foregoing descriptions are merely specific embodiments of the present application, but not intended to limit the protection scope of the present application. Those skilled in the art may easily conceive of various changes or modifications within the technical scope disclosed herein, all these should be covered within the protection scope of the present application. Therefore, the protection scope of the present application should be subject to the protection scope of the claims.

What is claimed is:

1. A voice interaction method comprising:
   receiving a wake-up voice;
   activating an interactive mode of a smart home appliance based on content of the wake-up voice;
   displaying a dialog prompt identification in the interactive mode of the smart home appliance;
   obtaining a vocal request, wherein the vocal request is input in response to the dialog prompt identification;
   displaying requested content according to the vocal request; and
   after displaying the requested content and before deactivating the interactive mode of the smart home appliance:
      displaying the dialog prompt identification again in the interactive mode;
      obtaining an updated vocal request; and
      displaying an updated requested content according to the updated vocal request.

2. The voice interaction method according to claim 1, wherein the dialog prompt identification comprises a search prompt indicator, and the search prompt indicator comprises a general search start prompt word and a preset dialogue timer.

3. The voice interaction method according to claim 1, wherein the dialog prompt identification comprises a content guide, and the content guide is used to prompt a user to provide a requested content relevant with the content guide.

4. The voice interaction method according to claim 1, wherein prior to activating the interactive mode based on the content of the wake-up voice, the method further comprises:
   determining whether a content of the wake-up voice is associated with a preset interaction scenario; and
   activating the interactive mode according to the wake-up voice when the content of the wake-up voice is associated with the preset interaction scenario.

5. The voice interaction method according to claim 4, wherein after obtaining the vocal request, the method further comprises:
   determining whether a content of the vocal request is associated with a search request in the preset interaction scenario; and
   exiting the interactive mode when the content of the vocal request is not associated with the search request in the preset interaction scenario.

6. A voice interaction device comprising:
   one or more processors; and
   a memory for storing one or more programs, wherein the one or more programs are executed by the one or more processors to enable the one or more processors to:
      receive a wake-up voice;
      activate an interactive mode of a smart home appliance according to the wake-up voice;
      display a dialog prompt identification in the interactive mode of the smart home appliance;
      obtain a vocal request, wherein the vocal request is input in response to the dialog prompt identification;
      display a requested content according to the vocal request; and
      after displaying the requested content and before deactivating the interactive mode of the smart home appliance:
         display the dialog prompt identification again in the interactive mode;
         obtain an updated vocal request; and
         display an updated requested content according to the updated vocal request.

7. The voice interaction device according to claim 6, wherein the one or more programs are executed by the one or more processors to enable the one or more processors to:
   determine whether a content of the wake-up voice is associated with a preset interaction scenario, and activate the interactive mode according to the wake-up voice, in a case that the content of the wake-up voice is associated with the preset interaction scenario.

8. The voice interaction device according to claim 7, wherein the one or more programs are executed by the one or more processors to enable the one or more processors to:
   determine whether a content of the vocal request is associated with a search request in the preset interaction scenario, and exit the interactive mode, in a case that the content of the vocal request is not is associated with the search request in the preset interaction scenario.

9. A non-transitory computer readable storage medium, in which a computer program is stored, wherein the computer program, when executed by a processor, causes a smart home appliance to:
   receive a wake-up voice;
   activate an interactive mode of the smart home appliance based on content of the wake-up voice;
   display a dialog prompt identification in the interactive mode of the smart home appliance;
   obtain a vocal request, wherein the vocal request is input in response to the dialog prompt identification;
   display requested content according to the vocal request; and
   after displaying the requested content and before deactivating the interactive mode of the smart home appliance:
      display the dialog prompt identification again in the interactive mode;
      obtain an updated vocal request; and
      display an updated requested content according to the updated vocal request.

10. The computer readable storage medium of claim 9, wherein the dialog prompt identification comprises a search prompt indicator, and the search prompt indicator comprises a general search start prompt word and a preset dialogue timer.

11. The computer readable storage medium of claim 9, wherein the dialog prompt identification comprises a content guide, and the content guide is used to prompt a user to provide a requested content relevant with the content guide.

12. The computer readable storage medium of claim 9, wherein prior to activating the interactive mode based on the content of the wake-up voice, the computer program causes the smart home appliance to:
    determine whether the content of the wake-up voice is associated with a preset interaction scenario; and
    activate the interactive mode according to the wake-up voice when the content of the wake-up voice is associated with the preset interaction scenario.

13. The computer readable storage medium of claim 12, wherein after obtaining the vocal request, the computer program causes the smart home appliance to:
    determine whether a content of the vocal request is associated with a search request in the preset interaction scenario; and
    exit the interactive mode when the content of the vocal request is not associated with the search request in the preset interaction scenario.

\* \* \* \* \*